(12) United States Patent
Fertig

(10) Patent No.: US 7,978,983 B2
(45) Date of Patent: Jul. 12, 2011

(54) OPTICAL TRIGGERED SELF-TIMED CLOCK GENERATION

(75) Inventor: Matthias W. Fertig, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/146,488

(22) Filed: Jun. 26, 2008

(65) Prior Publication Data

US 2009/0324245 A1 Dec. 31, 2009

(51) Int. Cl.
*H04B 10/00* (2006.01)
(52) U.S. Cl. .................................................. 398/155
(58) Field of Classification Search .................. 398/155
See application file for complete search history.

(56) References Cited

U.S. PATENT DOCUMENTS

| | | |
|---|---|---|
| 4,692,635 A | 9/1987 | Rapp |
| 5,329,176 A | 7/1994 | Miller, Jr. et al. |
| 5,434,520 A | 7/1995 | Yetter et al. |
| 5,546,354 A | 8/1996 | Partovi et al. |
| 5,987,620 A | 11/1999 | Tran |
| 6,785,184 B2 | 8/2004 | Nguyen et al. |
| 6,995,585 B2 | 2/2006 | Anand et al. |
| 2009/0269084 A1* | 10/2009 | Mizuno et al. ............... 398/214 |

OTHER PUBLICATIONS

Bhatnagar et al.; Receiverless detection schemes for optical clock distribution; Proceedings of the SPIE—The International Society for Optical Engineering; Jul. 6, 2004; vol. 5359, No. 1; pp. 352-352; (Quantum Sensing and Nanophotonic Devices, Jan. 25-29, 2004, San Jose, CA, USA); 8 pages.
Keeler et al.; Skew and Jitter Removal Using Short Optical Pulses for Optical Interconnection; IEEE Photonics Technology Letters, vol. 12, No. 6, Jun. 2000; pp. 714-716.

* cited by examiner

*Primary Examiner* — Shi K Li
(74) *Attorney, Agent, or Firm* — Schmeiser, Olsen & Watts; Randall Bluestone

(57) ABSTRACT

A self-timed clock circuit and method of generating a self-timed clock circuit. The circuit includes means for charging a circuit node in response to an external reset signal; means for discharging the circuit node in response to a trigger signal generated by a photodiode; means for generating a first signal indicating a logic level of the circuit node; means for generating and delaying a second signal indicating the logic state of the circuit node; means for combining the first and second signals to generate a recharge signal; and means for recharging the circuit node in response to the recharge signal.

25 Claims, 3 Drawing Sheets

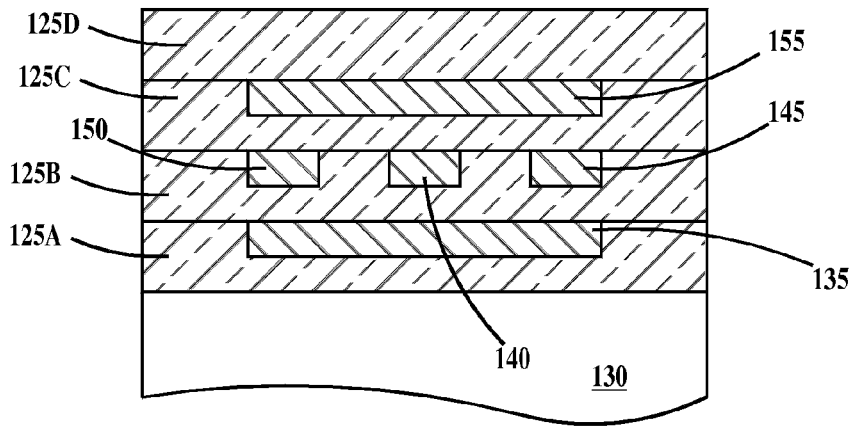
*FIG. 5*
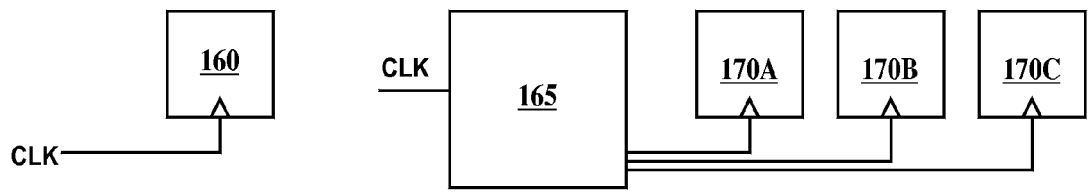
*FIG. 6A*  *FIG. 6B*
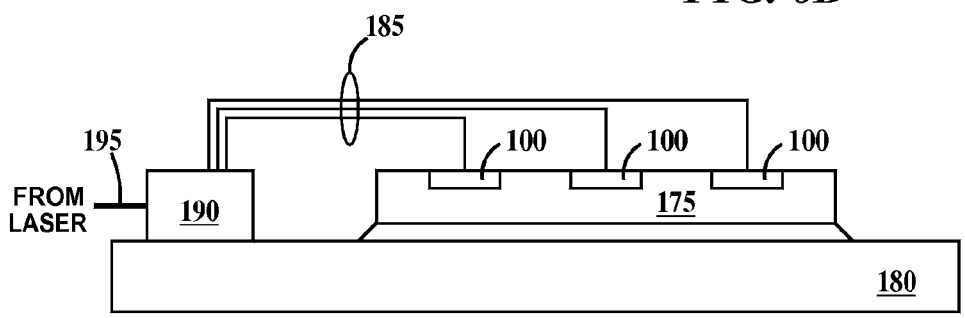
*FIG. 7A*
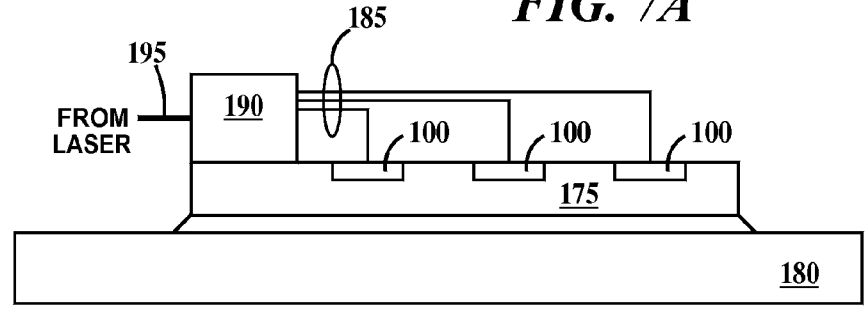
*FIG. 7B*

US 7,978,983 B2

OPTICAL TRIGGERED SELF-TIMED CLOCK GENERATION

FIELD OF THE INVENTION

The present invention relates to the field of integrated circuits; more specifically, it relates a method for and a circuit for generating a self-timed clock signal from an optical signal.

BACKGROUND OF THE INVENTION

In current CMOS technology clock signals are generated by oscillators using phase-locked loop circuits. Current clock generators and distribution networks are prone to skew and jitter which limit the clock frequency. Additionally, current clock generators consume significant amount of integrated circuit chip real estate that could otherwise be used for combinational logic. As I/O frequencies increase, power consumption and power density become more critical there exists a need in the art for improved methods and circuits for generating clock signals.

SUMMARY OF THE INVENTION

A first aspect of the present invention is a circuit, comprising: means for charging a circuit node in response to an external reset signal; means for discharging the circuit node in response to a trigger signal generated by a photodiode; means for generating a first signal indicating a logic level of the circuit node; means for generating and delaying a second signal indicating the logic state of the circuit node; means for combining the first and second signals to generate a recharge signal; and means for recharging the circuit node in response to the recharge signal.

A second aspect of the present invention is a PFET and an NFET, drains of the PFET and NFET connected to a circuit node; a source of the NFET connected to ground, a source of the PFET coupled to a voltage source; a photodiode, a cathode of the photodiode connected to the voltage source and an anode of the photodiode connected to a gate of the NFET; first and second inverters, an input of the first inverter connected to the circuit node and an output of the first inverter connected to an input of the second inverter, an output of the second inverter connected to an input of a delay circuit and coupled to an output pin of the circuit; and an AND gate, a first input of the AND gate connected to the output of the first inverter, a second input of the AND gate connected to an output of the delay circuit, an output of the AND gate connected to a gate of the PFET.

A third aspect of the present invention is a method of generating a clock signal, comprising: providing a circuit comprising a photodiode, a circuit node, a delay circuit and a clock output pin; discharging the circuit node in response to a trigger signal generated by the photodiode; generating a first signal indicating a logic level of the circuit node; generating and delaying a second signal indicating the logic state of the circuit node; coupling the second signal to the clock output pin; combining the first and second signals to generate a recharge signal; and recharging the circuit node in response to the recharge signal.

A fourth aspect of the present invention is an electronic assembly, comprising: an integrated circuit chip including a circuit according to the first aspect; means for receiving an output of a pulsed laser; means for distributing the output of the pulsed laser to the photodiode of the circuits; and one or more clocked devices, clock inputs of the one or more clocked devices coupled to the output signal.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

FIG. 5 is cross-sectional drawing illustrating an exemplary structure for a shielded wire;

FIG. 6A is a diagram illustrating a first method of distributing clock signals through an integrated circuit;

FIG. 6B is a diagram illustrating a second method of distributing clock signals through an integrated circuit; and FIGS. 7A and 7B are diagrams illustrating an exemplary device using clock generation circuits according to embodiments of the present invention.

DETAILED DESCRIPTION OF THE INVENTION

A clock signal is defined as a signal that alternates between a high voltage value (e.g., a logical 1) and a low value voltage value (e.g., a logical zero) in a periodic manner. The time duration between adjacent rising edges of a clock signal is one clock cycle. Often the high time duration is equal to the low time duration.

Skew is defined as the propagation delay of a clock signal along the distribution path of the clock signal. Skew causes different latches in an integrated circuit to receive a same edge of a clock signal at different times.

Jitter is defined as the time variation around the rising and falling edges of a clock signal.

A PFET is a p-channel field effect transistor and an NFET is an n-channel field effect transistor. PFETS and NFETs are the primary devices of complimentary metal-oxide-silicon (CMOS) technology. A CMOS compatible resistor may be formed, for example, by tying the gate of a PFET to VDD or the gate of an NFET to ground. Resistors may also be formed from by placing contacts at opposite ends of a polysilicon line (e.g., using an isolated gate electrode). CMOS compatible capacitors may take the form of trench capacitors or metal-insulator-metal (MIM) capacitors.

Figure 1:
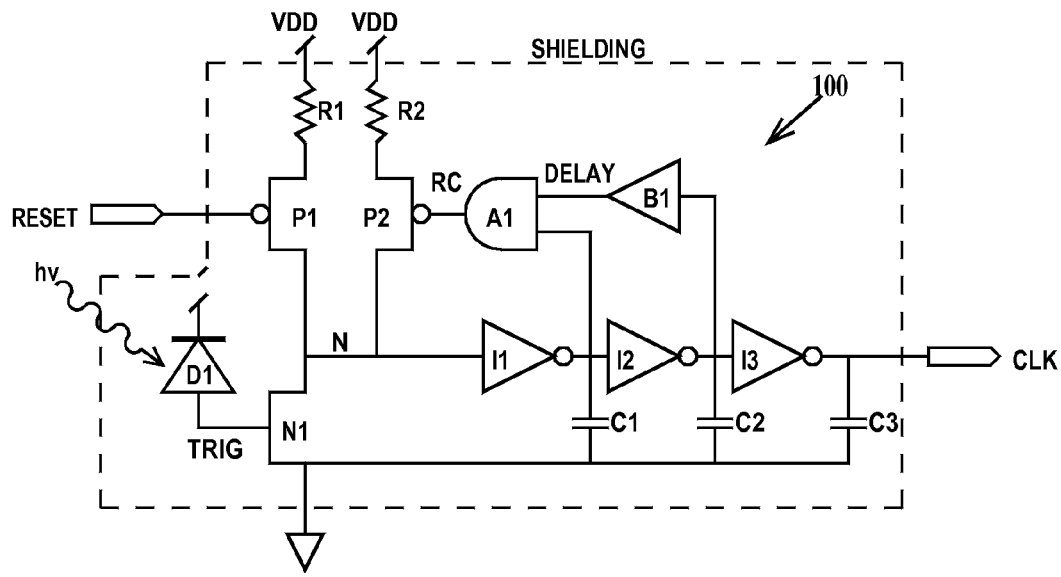
FIG. 1 is a schematic circuit diagram of a clock generation circuit according to embodiments of the present invention.

FIG. 1 is a schematic circuit diagram of a clock generation circuit according to embodiments of the present invention. In FIG. 1, a clock generation circuit 100 includes first and second PFETs P1 and P2, an NFET N1, a photodiode D1, first, second and third inventors I1, I2 and I3, first, second and third capacitors C1, C2 and C3, a delay circuit B1, an AND gate A1 and first and second resistors R1 and R2. First resistor R1 is optional. In one example, capacitors C1, C2 and C3 represent parasitic wiring capacitances which may be taken into account when designing clock generation circuit 100. Alternatively, one or more of capacitors C1, C2 and C3 may be added design elements of clock generation circuit 100. Second resistor R2 is optional. Third inventor I3 and third capacitor C3 are optional. Circuit 100 includes no pins for receiving an electronically generated clock signal. Circuit 100 does not require an external electrical timing signal to generate a clock signal.

In FIG. 1, the cathode of photodiode P1 is connected to VDD and the anode of photodiode P1 is connected to the gate of NFET N1. The source of NFET N1 is connected to ground and respective first plates of capacitors C1, C2 and C3. The drain of NFET N1 is connected to a circuit node N, as are the drains of PFETs P1 and P2. The source of PFET P1 is coupled to VDD through resistor R1 and the source of PFET P2 is coupled to VDD through resistor R2. Alternatively, R2 may be eliminated and the source of PFET P1 couple to VDD through resistor R1. Alternatively, both resistor R1 and R2 may be eliminated and the sources of PFETs P1 and P2 connected directly to VDD. Node N is connected to the input of first inverter I1. The output of first inverter I1 is connected to a second plate of first capacitor C1, to an input of second inverter I1, and to a first input of AND gate A1. The output of second inverter I2 is connected to a second plate of second capacitor C2, to an input of third inverter I3, and to an input of delay circuit B1. The output of third inverter I3 is connected to a second plate of third capacitor C2, and is connected to an output pin. Alternatively, if third inverter I3 and third capacitor C3 are not present, then the output of inverter I2 is connected to the output pin. The output of delay circuit B1 is connected to a second input of AND gate A1 and the output of AND gate A1 is connected to the gate of PFET P2. The gate of PFET P1 is connected to a reset input pin.

Circuit 100, when implemented in CMOS technology is takes up about 1000 times less integrated circuit chip real estate than a current art oscillator/phase lock loop clock generation circuit used to generate clock signals.

The purpose of resistors R1 (and R2) are to provide power dissipation in the event of a momentary connection between VDD and ground through PFET P1 and NFET N1 or PFET P2 and NFET N1. The primary input of circuit 100 is a trigger signal TRIG generated by photodiode D1 when photodiode D1 is struck by incident light. The output of circuit 100 is a clock signal CLK. A reset signal RESET on the reset input allows resetting node N to an initial logical 1 state (i.e., initial charging of node N1). Node N discharges through NFET N1 and recharges through PFET P2 (or through PFET P1 in case of a reset). The inverter chain comprised of invertors I1, I2, I3 and capacitors C1, C2, and C3 and provides signal amplification. The feedback loops from the output of inverter I1 to AND gate A1 and from the output of second inverter I2 to delay circuit B1 provide clock signal shaping as well as self-timing. In one example, the time delay through delay circuit B1 may be a programmable delay. Delay circuit B1 produces a delay signal DELAY and AND gate A1 produces a charge recharge signal RC.

The following conventions will be used in describing signal propagation or switching delays through circuit components: dN1 is the delay through NFET N1, dP1 is the delay through PFET P1, dP2 is the delay through PFET P2, dI1 is the delay through inverter I1, dI2 is the delay through Inverter I2, dA1 is the delay through AND gate A1 and dB1 is the delay through delay circuit. Circuit 100 is initialized by asserting reset high for a minimum time dP1, DI1, dI2 dB1, dA1, dP2. When reset is asserted high, the output of inverter I1 is low (e.g., logical zero) putting a low on the first input of AND gate A1 and the output of inverter I2 is high (e.g., logical one), putting a high on the second input of AND gate A1 after a delay dB1.

In operation, after node N is charged, a high pulse on the gate of NFET N1, causes node N to go low, causing CLK to go high, the first input of AND gate A1 to go high (e.g., logical 1) and the second input of AND gate A1 to go low after a delay of dI2+dB1. Because of the delay through delay circuit B1, there will be a window of time when the second input of AND gate is also high (from the previous cycle) before going low which turns on PFET P2 and recharges node N. The TRIG signal is a high precision repeating pulse signal. It is generated by photodiode D1 when photodiode D1 is exposed to a precision pulsed-laser beam. In one example, the pulse frequency (as opposed to the frequency of laser light itself) of the pulsed laser beam is between about 1 GHz and about 20 GHz. The upper limit of the laser pulse frequency is determined by the delay through the internal feedback loop I1/I2/B1/A1. The frequency of the TRIG signal is the same as the pulse frequency of the pulsed laser. It is advantageous that the jitter of the pulsed laser be in the order of about less than about 2 femto-seconds or less allowing portions of conventional electrical clock distribution trees to be replaced by optical counterparts.

Figure 2:
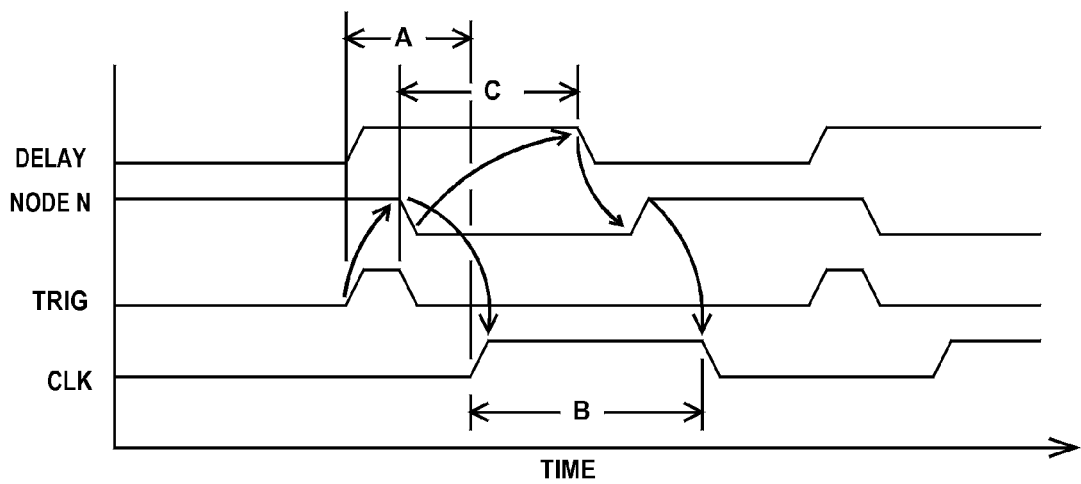
FIG. 2 is a timing diagram for the clock generation circuit of FIG. 2.

In one example, delay circuit B1 is implemented as a fixed delay. In one example, delay circuit B1 is a programmable delay. The advantage of a programmable delay is that the clock shape (the ratio between clock high and clock low time durations in each clock cycle, often this ratio is 1 as illustrated in FIG. 2) may be tuned. Delay circuit B1 may be implemented, for example, as wire delay (e.g., longer then required wire lengths), electrically programmable fuses (e-fuses), a serial latch chain, multiplexer selectable latch chains, and even number serial buffer chains. E-fuses and latch chains (depending on how they are multiplexed) are examples of delay circuits in which the delay may be programmed after fabrication of circuit 100 (see FIG. 1).

In order to avoid noise on adjacent circuits causing jitter on circuit 100 it is advantageous that circuit 100 be shielded as shown by the dashed line in FIG. 1. Examples of shielding include, but is not limited to locating circuit 100 device structures away from structures of adjacent circuits, avoiding running wires of circuit 100 parallel to wires of adjacent circuits, using shielded wires in circuit 100 (see FIG. 5), using a dedicated power supply for circuit 100 and combinations thereof.

It should be understood that there may be more than three inverters in the inverter chain as long as there are an odd number of inverters between node N1 and the second input of AND gate A1 and an even number of inverters between node N1 and the input of delay circuit B1 or vice versa.

FIG. 2 is a timing diagram for the clock generation circuit of FIG. 2. In FIG. 2, the rising edge of TRIG causes node N to fall and CLK to rise after a delay of dN1+dI1+dI2+dI3=A (or more generally, dN1+dI1+dI2+ . . . +dIi). Node N stays low until a falling edge of DELAY causes node N to rise, which, causes CLK to fall at the top of rising edge of node N. The delay between rising CLK and falling CLK is dI2+dB1=B. The times between rising adjacent rising edges of CLK, between adjacent rising edges of TRIG, between adjacent falling edges of node N and between adjacent rising edges of DELAY are all the same. There is also a dependency between the discharge of node N and the falling edge of DELAY, dI1+dI2+dB1=C.

Figure 3:
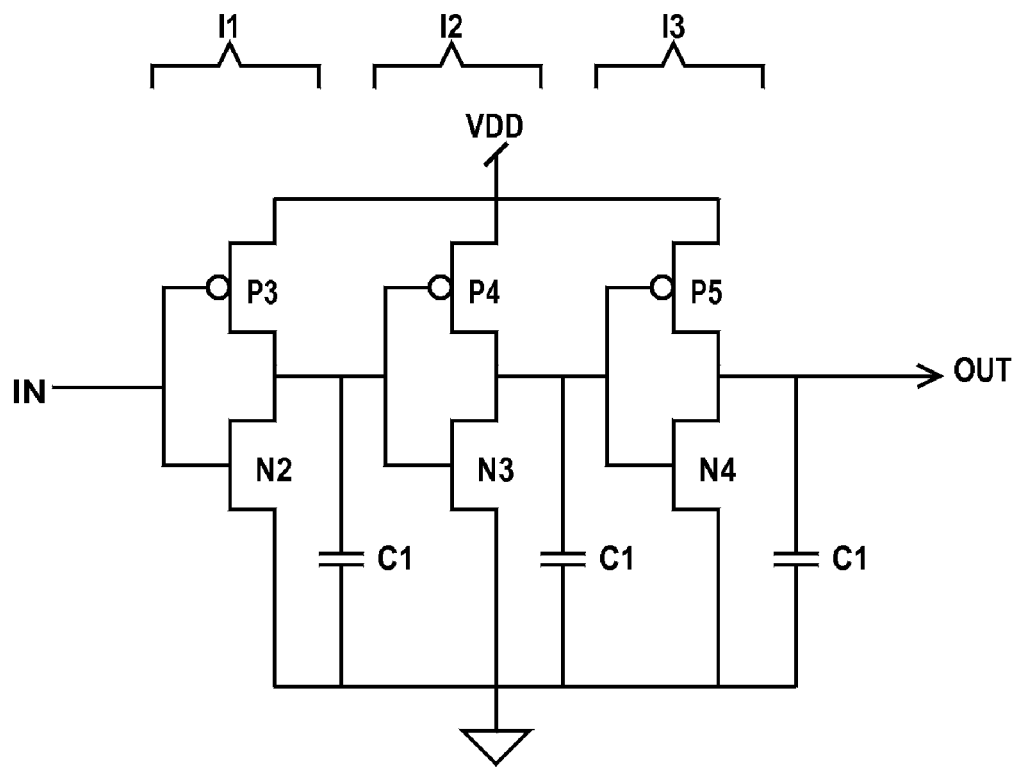
FIG. 3 is a schematic circuit diagram of the inverter chain of the clock generation circuit of FIG. 1.

FIG. 3 is a schematic circuit diagram of the inverter chain of the clock generation circuit of FIG. 1. It is advantageous that the delay through the inverter chain comprised of inverters I1, I2 and I3 be as short as possible. Inverter I1 includes PFET P3 and NFET N2, inverter I2 includes PFET P4 and NFET N3 and inverter I3 includes PFET P5 and NFET N4. The gain β of an inverter is the output current divided by the input voltage $V_{IN}$ minus the threshold voltage Vt. Tapering factor is defined as the ratio of the gains of adjacent inverters in a sequential chain of inverters. A minimum propagation delay possible through successive inverters (e.g., between I1 and I2 and between I2 and I3) is achieved when a tapering factor k is equal to e. So $\beta_{I3}=e\beta_{I2}$ and $\beta_{I2}=e\beta_{I1}$. The $\beta$ of a transistor is a function of the W/L ratio where W is the gate width and L is the gate length. Thus defining the $\beta$ of inverter I3 fixes the W/L ratio of PFET P5 and NFET N4. By selecting a tapering factor, the W/L ratios of PFETs P3 and P4 and NFETs N2 and N3 can be calculated and an inverter chain with minimum propagation delay be designed based on the minimum image size of the fabricating CMOS technology. Table I gives some performance characteristics of an inverter chain as a function of tapering factor. dI/dt is the rate of charge of Node N (see FIG. 1) in nA/ns and the propagation delay is given in ns.

TABLE I

|  | Tapering Factor | | |
| --- | --- | --- | --- |
|  | e | 4.6 | 10 |
| Max dI/dt | 2.8E5 | 1.8E5 | 0.6E5 |
| Propagation Delay | 0.92 | 0.95 | 0.99 |

In one example, the tapering factor of the inverter chain comprised of invertors I1, I2 and I3 of FIG. 1 is between about 8 and about 16. The ideal tapering factor would be e (where ln e=1). In one example, the tapering factor of the inverter chain comprised of invertors I1, I2 and I3 of FIG. 1 is between about e and about 16.

Figure 4:
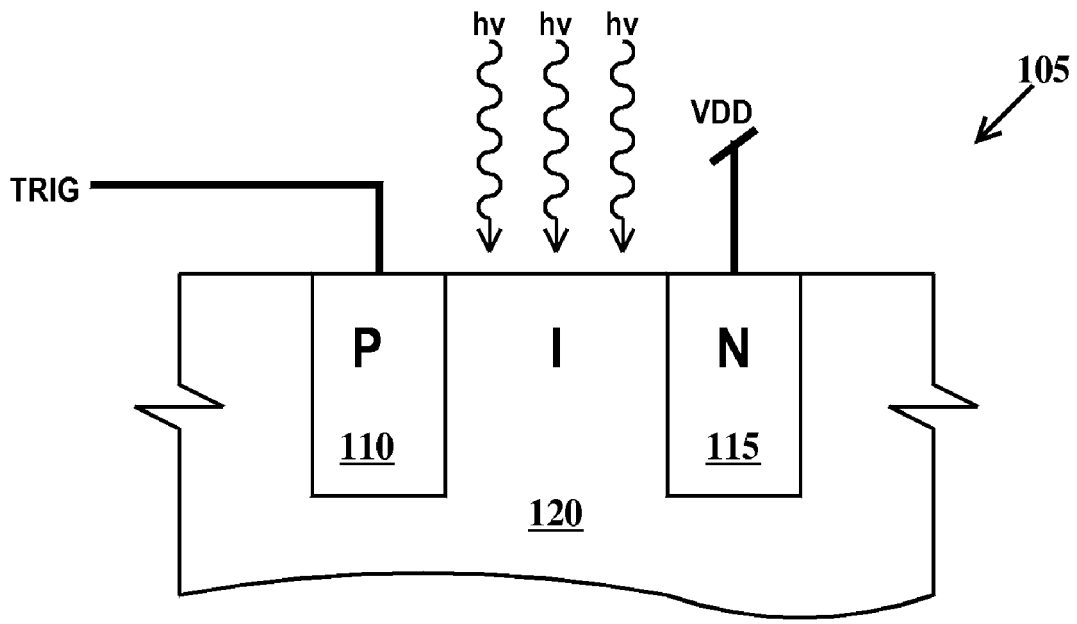
FIG. 4 is a cross-section of and exemplary photodiode that may be used in the clock generation circuit of FIG. 1.

FIG. 4 is a cross-section of and exemplary photodiode that may be used in the clock generation circuit of FIG. 1. In FIG. 4, a PIN diode 105 includes a P doped silicon region 110 separated from an N doped region by an intrinsic silicon region 120. Intrinsic region 120 may be lightly doped N or P type. Light striking the intrinsic region generates electron-hole pairs generating a conductive path between P doped region 110 and N-doped region 120.

FIG. 5 is cross-sectional drawing illustrating an exemplary structure for a shielded wire. In FIG. 5, a dielectric layers 125A, 125B 125C and 125D are formed over a substrate 130. Formed in dielectric layer 125A is a lower shield wire 135. Formed in dielectric layer 125B is a core wire 140 and first and second middle shield wires 145 and 150 formed on opposite sides of core wire 140. Formed in dielectric 125C is an upper shield wire 135. Lower shield wire 135, middle shield wires 145 and 150 and upper shield wire 155 are connected to ground, while core wire 140 is a signal/power supply wire of circuit 100 (see FIG. 1).

FIG. 6A is a diagram illustrating a first method of distributing clock signals through an integrated circuit. In FIG. 6A, clock signal CLK generated by circuit 100 (see FIG. 1) is connected to the clock input of a latch 160. More than one latch may be connected to the same clock signal line.

FIG. 6B is a diagram illustrating a second method of distributing clock signals through an integrated circuit. In FIG. 6B, clock signal CLIK generated by circuit 100 (see FIG. 1) is connected to a latch control block 165 where CLK is distributed to latches 170A, 170B and 170C. There may be multiple latch control blocks on the same integrated circuit chip, each latch control block supplied a CLIK signal from a different instance of circuit 100 (see FIG. 1).

FIGS. 7A and 7B are diagrams illustrating an exemplary device using clock generation circuits according to embodiments of the present invention. In FIG. 7A, an integrated circuit chip 175 is attached to a module 180. Wires in chip 175 are connected, for example, to wires in module 180 by wire-bonds (not shown) or solder bumps (not shown). Integrated circuit chip 175 includes three instances of circuit 100 connected by optical transmission lines 185 to a distribution device 190. Distribution device 190 is mounted on module 180 and connected to a pulsed laser by optical transmission lines 185. In one example, optical transmission lines 185 are external to chip 175. Alternatively, optical transmission lines 185 are waveguides fabricated as part of chip 175 and distribution device is mounted to chip 175 as in FIG. 7B.

Thus, the embodiments of the present invention provide methods of generating and distributing clock signals and circuits for generating clock signals having very low jitter and use a very small amount of integrated circuit real estate compared to conventional clock generators.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A circuit, comprising:
   means for charging a circuit node in response to an external reset signal;
   means for discharging said circuit node in response to a trigger signal generated by a photodiode;
   means for generating a first signal indicating a logic level of said circuit node;
   means for generating and delaying a second signal indicating said logic state of said circuit node;
   means for combining said first and second signals to generate a recharge signal; and
   means for recharging said circuit node in response to said recharge signal.

2. The circuit of claim 1, wherein a logical state of an output signal of said circuit is a function of a frequency of said trigger signal and a signal propagation delay through said means for generating and delaying said second signal.

3. An electronic assembly, comprising:
   an integrated circuit chip including a circuit according to claim 2;
   means for receiving an output of a pulsed laser;
   means for distributing said output of said pulsed laser to said photodiode of said circuits; and
   one or more clocked devices, clock inputs of said one or more clocked devices coupled to said output signal.

4. The electronic assembly of claim 3, wherein each of said one or more devices is independently selected from the group consisting of a latch and a latch control block, said latch control block coupled to one or more latches.

5. The electronic assembly of claim 3, wherein said means for distributing said output of said pulsed laser is selected from the group consisting of light pipes and waveguides.

6. The electronic assembly of claim 3, wherein said means for receiving an output of said pulsed laser is mounted to said integrated circuit chip.

7. The electronic assembly of claim 3, wherein said means for receiving an output of said pulsed laser is mounted to a module upon which said integrated circuit is mounted and electrically connected to.

8. The circuit of claim 1, wherein said second signal is a delayed and inverted version of said first signal.

9. The circuit of claim 1, wherein said means for generating said first signal and said means for generating and delaying said second signal comprises serially connected inverters.

10. The circuit of claim 1, wherein a tapering factor between said inverters is between about e and about 16.

11. The circuit of claim 1, wherein said means for combining said first and second signals is an AND gate.

12. The circuit of claim 1, wherein:
said means for charging said circuit node is a first PFET connected between a voltage source and said circuit node;
said means for discharging said circuit node is an NFET connected between said circuit node and ground; and
said means for recharging said circuit node is a second PFET connected between said voltage source and said circuit node.

13. The circuit of claim 1, wherein a time duration of a signal propagation delay through said delay circuit is programmable after fabrication of said circuit.

14. The circuit of claim 1, wherein said delay circuit comprises delay elements selected from the group consisting of electrically programmable fuses, a serial latch chain, multiplexer selectable latch chains, and even number serial buffer chains.

15. A circuit, comprising:
a PFET and an NFET, drains of said PFET and NFET connected to a circuit node;
a source of said NFET connected to ground, a source of said PFET coupled to a voltage source;
a photodiode, a cathode of said photodiode connected to said voltage source and an anode of said photodiode connected to a gate of said NFET;
first and second inverters, an input of said first inverter connected to said circuit node and an output of said first inverter connected to an input of said second inverter, an output of said second inverter connected to an input of a delay circuit and coupled to an output pin of said circuit; and
an AND gate, a first input of said AND gate connected to said output of said first inverter, a second input of said AND gate connected to an output of said delay circuit, an output of said AND gate connected to a gate of said PFET.

16. The circuit of claim 15, further including:
an additional PFET, a source of said additional PFET connected to said voltage source, a drain of said additional PFET connected to said circuit node, and a gate of said additional PFET connected to a reset pin.

17. The circuit of claim 15, further including:
a third inverter connected between said second inverter and said output pin.

18. The circuit of claim 15, further including:
a resistor connected between said PFET and said voltage source.

19. The circuit of claim 15, further including:
a first capacitor connected between said output of said first inverter and ground; and
a second capacitor connected between said output of said second inverter and ground.

20. The circuit of claim 15, further including:
an additional PFET, a source of said additional PFET connected to said voltage source, a drain of said additional PFET connected to said circuit node, and a gate of said additional PFET connected to a reset pin;
a third inverter connected between said second inverter and said output pin;
a first resistor connected between said PFET and said voltage source;
a second resistor connected between said additional PFET and said voltage source;
a first capacitor connected between said output of said first inverter and ground;
a second capacitor connected between said output of said second inverter and ground; and
a third capacitor connected between said output of said third inverter and ground.

21. A method of generating a clock signal, comprising:
providing a circuit comprising a photodiode, a circuit node, a delay circuit and a clock output pin;
discharging said circuit node in response to a trigger signal generated by said photodiode;
generating a first signal indicating a logic level of said circuit node;
generating and delaying a second signal indicating said logic state of said circuit node;
coupling said second signal to said clock output pin;
combining said first and second signals to generate a recharge signal; and
recharging said circuit node in response to said recharge signal.

22. The method of claim 21, further including:
generating said trigger signal by coupling said photodiode to an output of a pulsed laser.

23. The method of claim 21, wherein a logical state of said clock signal is a function of a frequency of said trigger signal and a signal propagation delay through said delay circuit.

24. The method of claim 21, wherein said clock signal is a delayed and inverted version of said first signal.

25. The method of claim 21, wherein said clock signal is self-adjusted by suppressing said circuit node through a feedback path through said delay circuit to said circuit node.

* * * * *